Patented July 17, 1928.

1,677,182

UNITED STATES PATENT OFFICE.

ALEXANDER HASSELBACH, OF DESSAU, GERMANY, ASSIGNOR TO G. POLYSIUS, OF DESSAU, GERMANY, A PARTNERSHIP.

METHOD OF MANUFACTURING CEMENTS RICH IN ALUMINA.

No Drawing. Application filed September 27, 1924, Serial No. 740,395, and in Germany February 19, 1924.

While Portland-cement requires a burning temperature of about from 1400 to 1500° C., the aluminous cements (so-called "ciments electriques") which are produced in electric smelting kilns or the so-called "ciment fondu" produced in water-jacket kilns require a considerably higher temperature, viz, about 1600° C. This aluminous cement contains much aluminium and has a wide range of applications owing to its prominent hardening properties and its stableness as regards the action of acids. A disadvantage resides, however, in the high price of this kind of cement, but this price is conditioned by the high manufacturing costs, as well as, and especially, by the fact that said cement could be manufactured only in certain distinct amounts in the electric kiln, not continuously in a rotary kiln. This fact has been confirmed repeatedly in technical periodicals of the line in question where there has been said that the usual cement kilns are not suited for use in connection with cements rich in aluminium as in these kilns, i. e., in the rotary kilns, very strong adhering of the softening mass is followed, when the mass is heated more strongly, by rapid streams, nearly torrents, of molten cement instead of by clinkers.

It has been a surprise to discover that the sintering process, or the smelting-phase respectively, can be carried through continuously without any risk in a rotary kiln if fluor-spar is added to the raw mixture, whereby the sintering temperature and the smelting temperature are decreased and all drawbacks met with if no fluor-spar is added are obviated.

Now, the present invention constitutes a practical application, or a utilization, of that discovery, and my improved process of manufacturing cements rich in aluminium consists in introducing the raw substances concerned, viz, essentially lime and bauxite, mixed with finely ground fluor-spar, which should amount to from 2 to 3% of the whole mass, depending upon impurities in the various ingredients, into a rotary kiln and burning the mixed substances continuously at a temperature lying below the sintering or smelting temperature generally used.

I am aware of the fact that it is known to add fluor-spar to Portland-cement for the purpose of reducing the fusing point, but this process, although affording considerable advantages, has proved practically inapplicable because there are introduced detrimental components into the burned clinkers by the finished product owing to the fluor-spar contained in this latter, the clinkers made from cement manufactured with the aid of the fluor-spar having, in fact, other properties that the clinkers made from cement manufactured without that addition. The point now is that the detrimental other properties do not come into existence if the cement is rich in aluminium, and it is, therefore, possible to carry through the improved process continuously in a rotary kiln, whereas hitherto an electric kiln with its great expenditure of energy (2000 kilowatt per ton) and enormous consumption of electrodes was required. Owing to the now afforded possibility to burn the cement in a rotary kiln the process has been rendered far more economical, also because of its continuity. The melting temperature at present employed amounts to 1600° on an average.

I claim:

1. The method of manufacturing cements rich in aluminium, consisting in introducing the raw mixture together with a small percentage of fluor-spar into a rotary kiln and carrying through the burning procedure at a temperature lying below the melting temperature at present employed in making cements without the addition of fluor-spar.

2. The method of manufacturing cements rich in aluminium, consisting in introducing the raw mixture together with a small percentage of finely ground fluor-spar into a rotary kiln and carrying through the burning procedure at a temperature lying below the melting temperature at present employed in making cements without the addition of fluor-spar.

In testimony whereof I affix my signature.

ALEXANDER HASSELBACH.